W. F. OLIN.
Harvesting-Machine.

No. 219,871.                 Patented Sept. 23, 1879.

Witnesses:                              Inventor:

UNITED STATES PATENT OFFICE.

WILLIAM F. OLIN, OF CHICAGO, ILLINOIS, ASSIGNOR TO HIMSELF AND WILLIAM DEERING, OF SAME PLACE, ONE-HALF TO EACH.

IMPROVEMENT IN HARVESTING-MACHINES.

Specification forming part of Letters Patent No. 219,871, dated September 23, 1879; application filed July 2, 1878.

*To all whom it may concern:*

Be it known that I, WILLIAM F. OLIN, of the city of Chicago, Cook county, State of Illinois, have invented new and useful Improvements in Harvesting-Machines, of which the following is a full description, reference being had to the accompanying drawings.

Figure 1:
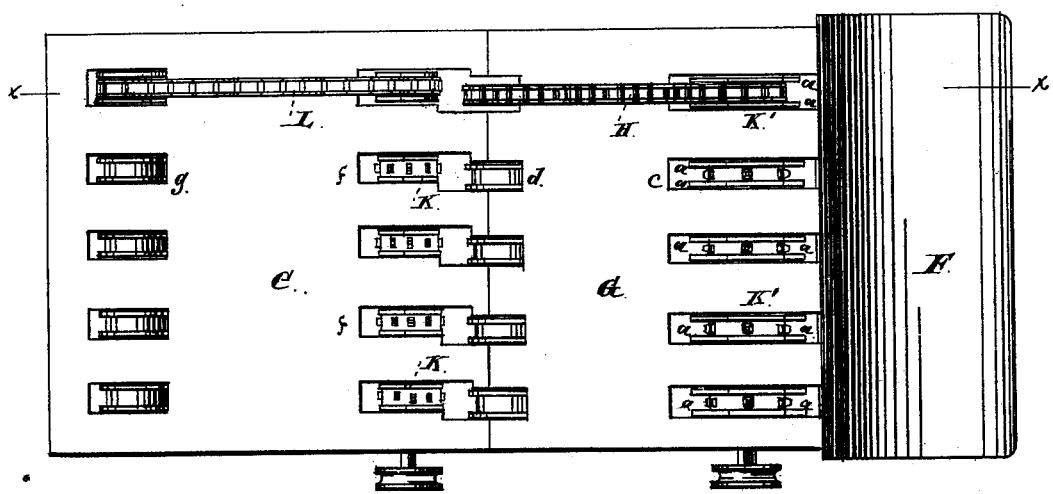
Figure 2:
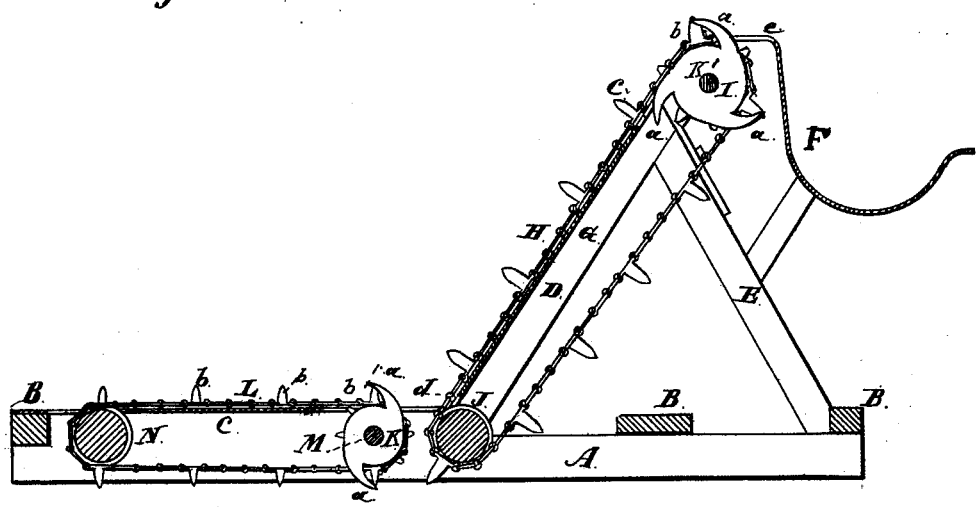

Figure 1 is a top or plan view; Fig. 2, a longitudinal section on line $x$ $x$ of Fig. 1.

The object of this invention is to improve the delivery of the grain to the receptacle or binder of a harvesting-machine; and its nature consists in providing curved arms or horns, arranged at the delivery end for the grain, in relation to the teeth of the chains or belts which carry or move the grain on the machine, to take the place of the teeth, and carry the grain over the roller or other devices which operate the chains or belts, and to which the arms or horns are directly attached.

In the drawings, A represents the main frame; B, the cross-beams; C, the lower or carrier platform; D E, the elevator-frame; F, the receiving table or receptacle; G, the backboard for the elevator; H, the elevator-chains; I J, the elevator-rollers; K K', the sprocket-wheels; L, the chains for the lower or carrier platform; M N, the rollers for the chains L; O P, the pulley-wheels for driving the rollers I M; $a$, the curved arms or horns; $b$, the chain-teeth; $c$, $d$, $e$, $f$, and $g$, openings for the passage of the arms $a$ and teeth $b$, which openings must be of a size just sufficient to permit the arms and teeth to pass without coming in contact with their edges.

The machine represented in the drawings belongs to that class of harvesting-machines in which the grain as it is cut falls upon a lower or carrier platform, and is taken therefrom by a chain or belt elevator and delivered to the receptacle or binding mechanism to be bound, and the main-frame A, cross-beams B, lower or carrier platform C, elevator-frame D E, and its elevator-chains H, with their teeth $a$, receptacle or table F, backing-board G, elevator-rollers I J, chain L, with their teeth $a$, and rollers M N in the carrier-platform may be constructed and arranged in any of the well-known forms for machines of this class, except that the table or receptacle F is to be so constructed and arranged as that the delivery-arms will deposit the grain thereon, and its rear edge may extend up nearly to the delivery-roller, so as to form a guide to direct the grain into the receptacle. Only so much of the machine as is necessary to illustrate the invention is shown; but such machine is to be supplied with the ordinary appliances to make a complete machine, which appliances are arranged and operated as usual.

In this class of machines the grain as it falls upon the carrier-platform C is carried to the foot of the elevator by means of the chains L, or in some other suitable manner, and is taken therefrom by the teeth $b$ of the elevator-chains H, and carried up and delivered to binders or a binding mechanism, the chains H L being operated by suitable sprocket-wheels K' K, located on the rollers I M, which rollers are driven by means of a chain or belt passing over the rollers O P in the usual manner.

The sprocket-wheels K K' are of the usual construction, except that they are provided with curved arms or horns $a$, located, as shown, on the periphery of the retaining side flanges, and so arranged that the points thereof will be above the face of the wheel the same distance that the teeth $b$ project when passing over the wheel, and their position on the wheel K, and the number thereof, is such, with reference to the teeth, that as each tooth approaches the wheel an arm will be in position to relieve it of the grain.

The teeth $b$ travel in a straight line from the roller J until they reach the roller I, over which they pass in an arc of a circle, while the arms $a$ travel in the arc of a circle continuously; and the arms are so arranged as to engage with the teeth $b$ before the teeth reach the roller and while their line of travel is straight, so that by the time the tooth $b$ reaches the roller to ascend thereover the arm $a$ which has come in line therewith will pass ahead of the tooth by reason of its travel in the arc of the circle, and will take the grain from such tooth, so that when the tooth is passing over the roller the grain will be lifted and carried over the roller by the arm instead of the tooth, this arm $a$ having passed ahead far enough to bring its point in line with the point of the tooth, so that the two points will coincide while the grain is being carried over the roller and until the tooth commences its descent on the opposite side of the roller, when it will be gradually withdrawn from contact with its arm, leaving the grain free to be delivered by the arm.

By making the arms take the place of the teeth, in the manner described, while passing over the roller, no grain can possibly catch on the teeth and be carried over thereby, so as to clog the elevator and interfere with the proper delivery of the grain.

The face of the arm $a$ which comes in contact with the grain is curved, so as to enable the easy withdrawal of the arm, and prevent any grain sticking thereto, the curve for this purpose being a gradual one from the base, where it is connected with the wheel to the point. These curved arms $a$ may be cast or formed with the sprocket-wheels, or they may be made separate and secured thereto in any suitable manner, or they may be secured directly to the roller; but in all cases their arrangement must be such as to take the grain from the teeth before it reaches the roller, travels ahead of the teeth to the roller, and have their points in line with the points of the teeth, and travel therewith while passing over the roller, so as to relieve the teeth from supporting and carrying the grain while it is passing over the roller.

In that class of machines where the grain is not elevated, but is delivered directly to the binder from the lower or carrier platform, the curved arms or horns $a$ can be secured to the inner roller, M, and will act to take the grain from the teeth in the same manner, the relative positions and the operation of the arms and teeth being the same as when attached to the roller I. In this latter case the arms will, to a certain extent, compact the grain into shape for binding.

The device can be attached to the lower platform of a harvester using an elevator, for the purpose of taking the grain from the teeth and keeping them clear, so as to prevent clogging.

The number of arms $a$ required will depend upon the distance that the teeth are located apart on the chain.

I am aware that it is not new in straw-carriers to clear the delivery end by means of projections upon the carrying-pulleys, and I do, therefore, not claim such, broadly, as my invention.

What I claim as new, and desire to secure by Letters Patent, is—

1. The combination of the wheels K, having the arms $a$, with the chains L, platform C, and elevating-chains H, whereby the passing straw or grain is lifted from the carrying-platform to and against the elevating-chains, by which it is received and elevated, substantially as specified.

2. The combination of the wheels K, having the arms $a$, chains L, and platform C of a harvester-carrier with the chains H, back-board G, wheels K', having the arms $a$, and receiver F, all constructed and operating substantially as set forth.

WILLIAM F. OLIN.

Witnesses:
O. W. BOND,
HEINR. F. BRUNS.